United States Patent
Morales et al.

(10) Patent No.: US 6,610,229 B1
(45) Date of Patent: Aug. 26, 2003

(54) FIBER PREFORM PROCESS EMPLOYING A PORCELAIN ENAMEL COATED SCREEN TOOL

(75) Inventors: Arianna T. Morales, Royal Oak, MI (US); Elisabeth J. Berger, Farmington Hills, MI (US); Jessica A. Schroeder, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 290 days.

(21) Appl. No.: 09/638,010

(22) Filed: Aug. 14, 2000

(51) Int. Cl.[7] .................... B29B 11/08; B29C 45/00; B29C 70/70
(52) U.S. Cl. ................. 264/123; 264/101; 264/109; 264/271.1; 264/275; 264/279; 264/279.1
(58) Field of Search .................. 264/517, 86, 632, 264/633, 637, 219, 338, 101, 109–122, 271.1, 275, 279; 249/115; 425/80.1, 81.1; 501/21, 25

(56) References Cited

U.S. PATENT DOCUMENTS

| 4,931,551 A | * | 6/1990 | Albisetti et al. ............. 536/20 |
| 5,407,631 A | | 4/1995 | Salisbury .................... 264/517 |
| 5,688,467 A | | 11/1997 | Kelman et al. ............. 264/517 |
| 5,843,365 A | | 12/1998 | Pinson et al. ............... 264/517 |
| 6,216,332 B1 | * | 4/2001 | Jou ............................ 427/348 |

* cited by examiner

Primary Examiner—Stephen J. Lechert, Jr.
(74) Attorney, Agent, or Firm—Kathryn A. Marra

(57) ABSTRACT

Screen tooling having a durable coating system, and a fiber preforming process employing the tooling. The coating system comprises a surface layer of a porcelain enamel composition that is generally a borosilicate glass, and preferable contains quartz, borax, boric oxide, potassium nitrate, sodium silicofluoride, and manganese dioxide, and optionally contains titanium dioxide, antimony oxide, cobalt oxide and/or barium oxide.

10 Claims, 1 Drawing Sheet

FIBER PREFORM PROCESS EMPLOYING A PORCELAIN ENAMEL COATED SCREEN TOOL

TECHNICAL FIELD

The present invention generally relates to fiber preforming methods and tooling used to form fiber preforms. More particularly, this invention relates to screen tooling for a fiber preforming process and a coating system therefor, in which the coating system inhibits sticking of fiber preforms to the tooling and promotes the tooling life of the screen tooling.

BACKGROUND OF THE INVENTION

Various methods are known for forming fiber preforms that are suitable for producing fiber-reinforced articles, such as glass-reinforced polymer composite beds for pickup trucks. One such method is referred to as directed fiber preforming, which makes use of a perforated screen tooling having a surface whose shape corresponds to that of the desired fiber-reinforced article. In this process, reinforcement fibers (typically glass fibers) are sprayed onto the surface of the screen tooling and held on the tooling surface by a vacuum drawn through the tooling. The fibers are then bonded together with a binder to yield a porous fiber preform having a fixed shape corresponding to that of the tooling surface. The binder may be precoated on the fibers, simultaneously sprayed with the fibers onto the tooling, or sprayed on the fibers while the fibers are held on the tooling under vacuum. After curing, the fiber preform is removed from the screen tooling and placed in a suitable mold into which a resin is injected to infiltrate the preform. The resin is then cured to yield the fiber-reinforced article.

The release of the preform from the screen tooling is a processing issue for directed fiber preforming processes. For the preform to maintain its integrity, it must release cleanly from the tooling after the binder has been cured. However, in the process of bonding the fibers together, the binder also tends to adhere the preform to the tooling. In the past, screen tooling has been coated with a release agent or a semi-permanent coating such as polytetrafluoroethylene (PTFE, or TEFLON®) to inhibit the preform from adhering to the tooling. While suitable for many applications, release agents must typically be reapplied after each preform operation and may adversely affect the properties of the preform. TEFLON® coatings are not sufficiently durable to survive numerous molding operations, and therefore require significant production downtime to repair the coating or completely recoat the screen tooling.

In view of the above, it would be desirable if an improved screen tooling and coating system were available that was more durable, reduced or eliminated the requirement for release agents, and extended the service life of the tooling.

SUMMARY OF THE INVENTION

The present invention is directed to an improved screen tooling for a fiber preforming process, and more particularly to a durable coating system for such tooling. The coating system of this invention comprises a surface layer of a porcelain enamel composition that is generally a borosilicate glass, and preferably contains quartz ($SiO_2$), dehydrated borax ($Na_2B_4O_7$), boric acid ($H_3BO_3$), potassium nitrate ($KNO_3$), sodium silicofluoride ($Na_2SiF_6$), and manganese dioxide ($MnO_2$), and optionally contains titanium dioxide ($TiO_2$), antimony oxide ($Sb_2O_3$), cobalt oxide [cobaltous oxide (CoO), cobalto-cobaltic oxide ($Co_3O_4$) and/or cobaltic oxide ($Co_2O_3$)] and/or barium oxide (BaO). Preferred compositions are dependent in part on the screen tooling material. The invention also encompasses a fiber preforming process that utilizes screen tooling with the coating system.

According to the present invention, continuous coatings formed of porcelain enamel compositions have been shown to be more durable than semi-permanent coatings currently in use, and therefore require less maintenance such that production cost and downtime are reduced. In addition, it has been determined that preforms release more readily and cleanly from screening tooling protected by the coating system of this invention, such that the quality of the fiber preform and therefore the final fiber-reinforced article is promoted. The use of release agents can be reduced or eliminated with the coating system, thereby decreasing the preform process cycle time and reducing the likelihood that the release agent will degrade the preform properties.

Other objects and advantages of this invention will be better appreciated from the following detailed description.

DESCRIPTION OF THE PREFERRED EMBODIMENT

Figure 1:
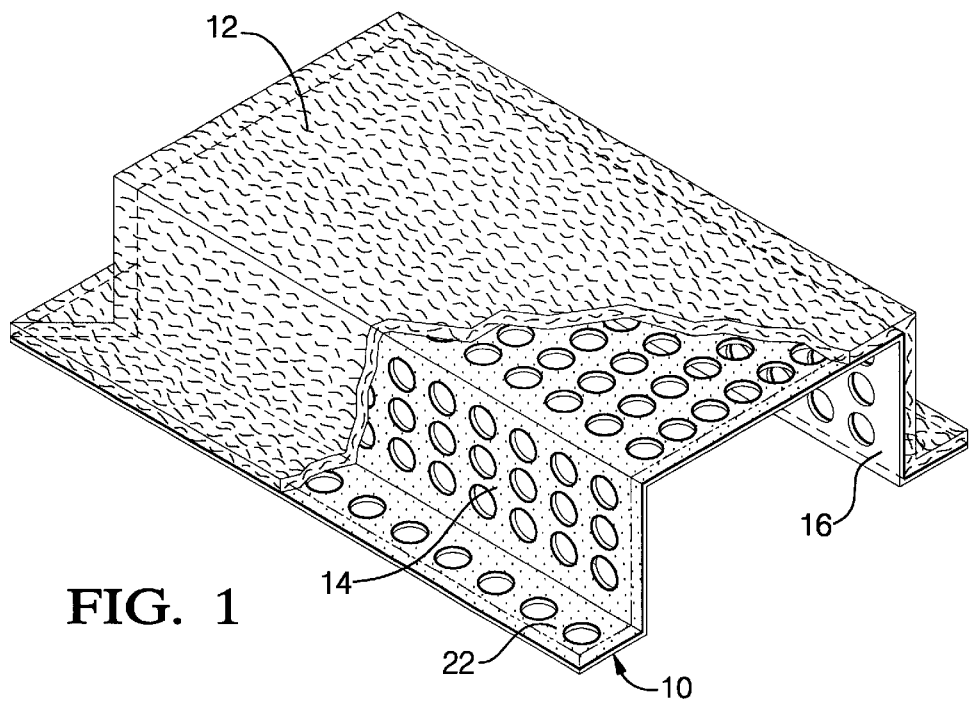
FIG. 1 schematically represents a perforated screen tooling with a continuous outer porcelain enamel coating in accordance with the present invention, on which a fiber preform is formed by a directed fiber preforming process.
Figure 2:
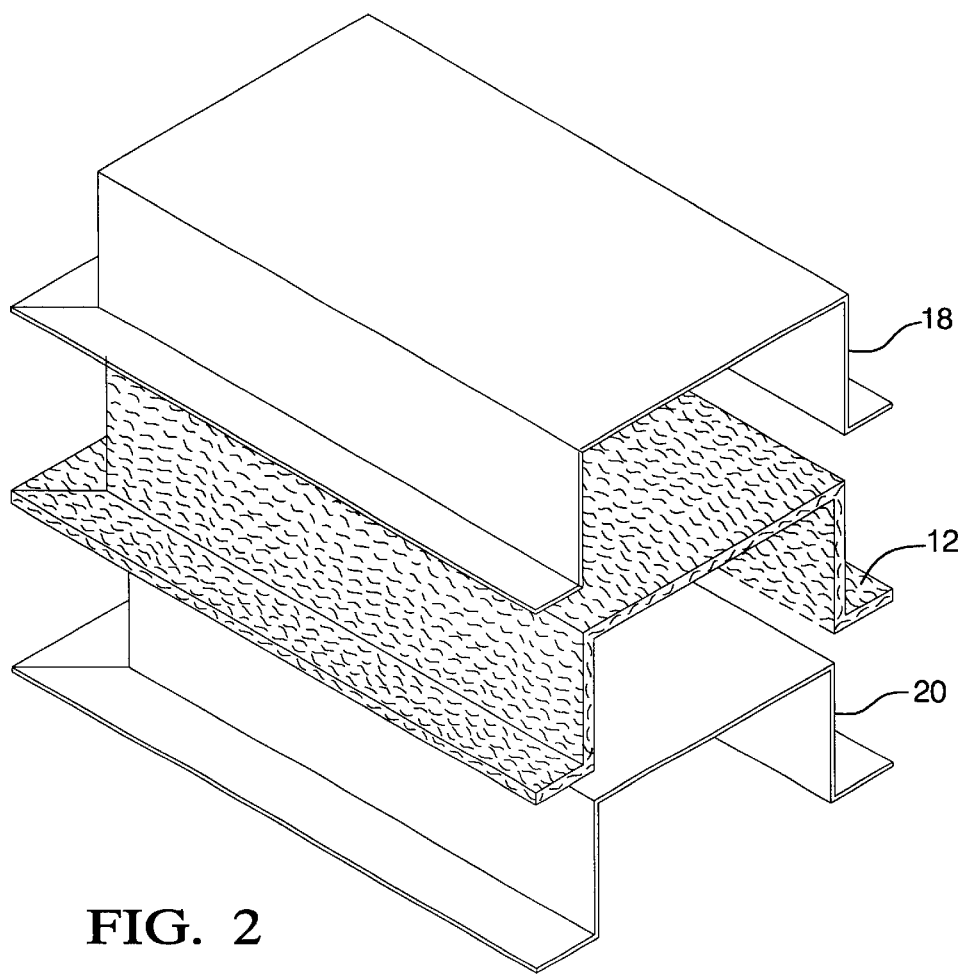
FIG. 2 schematically represents an apparatus for molding an article reinforced with the directed fiber preform produced with the perforated screen tooling of FIG. 1.

Tooling 10 for a fiber preforming process is represented in FIG. 1, along with a fiber preform 12 produced with the tooling 10. The tooling 10 is represented as a perforated screen of the type used in directed fiber preforming processes, in which reinforcement fibers, e.g., glass fibers, are sprayed or otherwise deposited on the tooling surface 14 of the screen tooling 10, and thereafter held on the tooling surface 14 by a vacuum drawn through the tooling 10 from the opposite side 16 of the tooling 10. The thickness and uniformity of the layer of fibers on the tooling 10 will depend in part on the shape of the tooling surface 14, the vacuum, and the physical properties of the fibers. A binder is coated on the fibers prior to deposition, or simultaneously sprayed with the fibers onto the tooling surface 14, or sprayed on the fibers while the fibers are held on the tooling 10 under vacuum. According to one known technique, the screen tooling 10 with the mass of fibers held at its surface 14 is then rotated into an oven where the binder is cured, yielding the porous fiber preform 12 whose shape corresponds to the surface 14 of the tooling 10. Thereafter, the fiber preform 12 is removed from the screen tooling 10 and placed in a suitable mold 18, which is represented in FIG. 2. A resin is injected into the mold 18 to infiltrate the preform 12. The resin-impregnated fiber preform 12 is then heated to cure the resin and thereby yield the desired fiber-reinforced article. Those skilled in the art will appreciate that FIGS. 1 and 2 are merely for illustrative purposes, in that the shape of the tooling 10, and therefore the shape of the preform 12, can differ significantly from that shown.

According to the present invention, the screen tooling 10 includes a coating system on at least its outer surface to prevent or at least inhibit the fibers and binder from adhering to the tooling 10 after the curing process. The coating system of this invention includes a porcelain (vitreous) enamel coating 22 (stippled layer in FIG. 1) that is preferably continuous on the surface 14 of the tooling 10. One or more intermediate layers could be used to promote the adhesion between the enamel coating and the surface of the tooling 10. The composition of the coating is formulated to be abrasion, heat and corrosion-resistant and inhibit the preform 12 from adhering to the tooling 10. The material of the tooling 10 preferably has a low free carbon content in order to reduce the likelihood of blistering and poor adhesion of the coating to the tooling. For this purpose, low carbon steels are suitable for the tooling 10, though other materials having a low free carbon content could be used, such as steels with about 0.3 wt. % titanium and about 0.15 wt. % silicon to maintain free carbon at very low levels.

According to the present invention, the porcelain enamel coating is generally a borosilicate glass composition that has been fused to the surface of the screen tooling 10 by depositing a slip having an appropriate composition on the tooling 10, and then firing at an elevated temperature. Borosilicate coatings of the type required by this invention are always highly complex in their formulation, with physical and mechanical properties that are determined principally by their composition. In turn, the coating composition must be carefully selected and evaluated to ensure compatibility with the composition of the substrate, the manner in which the coating is deposited, the desired function of the coating, and the service conditions that the coating must withstand.

The porcelain composition employed by the present invention is formed by firing a slip composition containing quartz ($SiO_2$), dehydrated borax ($Na_2B_4O_7$), boric acid ($H_3BO_3$), potassium nitrate ($KNO_3$), sodium silicofluoride ($Na_2SiF_6$), and manganese dioxide ($MnO_2$), and optionally containing titanium dioxide ($TiO_2$), antimony oxide ($Sb_2O_3$), cobalt oxide [cobaltous oxide (CoO), cobaltocobaltic oxide ($Co_3O_4$) and/or cobaltic oxide ($Co_2O_3$)] and/or barium oxide (BaO). Suitable ranges for the prefired constituents of the coating composition are, in weight percent, about 39 to 52 quartz, about 15 to 24 dehydrated borax, about 6 to 12 boric acid, about 5 to 8 potassium nitrate, about 3 to 6 sodium silicofluoride, about 3 to 12 manganese dioxide, up to 15 titanium dioxide, up to 3 antimony oxide, up to 1 cobalt oxide, and up to 1 barium oxide. The dry constituents are mixed with water to form an aqueous dispersion of the dry constituents as a slip, in accordance with known practices. The slip can then be deposited by air or electrostatic liquid spray on iron and steel substrates, and fired at about 750° C. to 900° C. to yield a coating whose thickness is about 75 to 150 micrometers. The final composition of the coating will depend in part on the firing conditions, but will include the above-noted dry constituents of the slip with the exception of boric oxide ($B_2O_3$) derived from the boric acid component of the slip. Suitable constituent ranges for the final coating are, in weight percent, about 39 to 52 quartz, about 15 to 24 borax, about 7 to 12 boric oxide, about 5 to 12 potassium nitrate, about 3 to 8 sodium silicofluoride, about 3 to 12 manganese dioxide, up to 12 titanium dioxide, up to 8 antimony oxide, up to 1 cobalt oxide, and up to 1 barium oxide.

An investigation was undertaken directed to evaluating the release capability and the durability of coatings on steel screens. The screens were perforated 2×4 ft. (about 0.6×1.2 m) P20 steel with about 40% open area. A first screen was coated with a slip whose dry constituents consisted of, in weight percent, about 46.5 quartz, about 21 dehydrated borax, about 7.5 boric acid, about 6 potassium nitrate, about 5 sodium silicofluoride, about 11.5 manganese dioxide, and about 2.5 antimony oxide. The screen was fired at a temperature of about 880° C. to yield a continuous porcelain enamel coating having a thickness of about 150 micrometers. Other screens of identical construction and composition were not coated, or were painted with a layer of PTFE, or were plated with a layer of a nickel-phosphorous-PTFE alloy having a thickness of about 50 micrometers. Each type of specimen was evaluated with a release agent: an organic metal working fluid available from Quaker Chemicals under the name DRAW 58, a wax compound available from ChemTrend under the name CT2044, or a PTFE emulsion available from ChemTrend under the name CT88WA. The release agents were chosen based on their effectiveness to release a preform from the uncoated screen without causing molding problems or degrading the bulk mechanical properties of the preform.

The preforms were formed of a chopped glass fiber material that was coated with a polyester emulsion available from Cook Composites and Polymers under the name Stypol 44–7013. While the binder was cured at about 204° C. with a peroxide curing agent, the fiber material was held to the surfaces of the screens under a vacuum of about 102 mbar. Following cure, the preforms were removed from the screens, and the screens were prepared as necessary for reuse by cleaning with a commercially-available chemical stripping agent to remove any residual binder and reapplying the release agent (if used). The production of at least 150 preforms per screen was targeted for the investigation.

The following observations were made during this investigation. The baseline uncoated screens did not show signs of wear, but required frequent application of a mold release and frequent cleaning. The screen provided with only a PTFE coating performed well in terms of ease of removing preforms, but was beginning to show signs of wear after 150 preforms. This screen required careful and more time-consuming cleaning than the baseline (uncoated) screen. The screen coated with the nickel-phosphorous-PTFE alloy also performed better than the baseline screen, but showed signs of wear and required frequent application of the mold release agent to extract the preforms. Finally, from the standpoint of the ability to easily remove preforms without damaging the preforms and without repairing the coating, the screen provided with the porcelain enamel coating of this invention performed better than any of the others tested, regardless of whether the screen was coated with a release agent. That is, using the porcelain coating, the screen releasibility is almost as good as with PTFE, and the porcelain will be more durable and less expensive. From this investigation, it was concluded that the porcelain enamel coating combined the robustness of the uncoated screen with the release capability of the PTFE-coated screen, while achieving lower processing costs.

While the invention has been described in terms of a preferred embodiment, it is apparent that other forms could be adopted by one skilled in the art. Accordingly, the scope of the invention is to be limited only by the following claims.

What is claimed is:

1. A fiber preforming process comprising the steps of:
   providing a screen tooling having a coating system fused to a surface thereof, the coating system comprising a surface layer of a porcelain enamel composition;
   depositing a fiber material on the surface layer of the coating system on the screen tooling;
   bonding the fiber material together to form a fiber preform;

removing the fiber preform from the screen tooling;

placing the fiber preform in a mold;

injecting a resin into the mold to infiltrate the fiber preform; and then curing the resin to form a fiber-reinforced article.

2. The fiber preforming process according to claim 1, wherein the screen tooling is a perforated member, the coating system being continuous over a surface of the perforated member.

3. The fiber preforming process according to claim 1, wherein the porcelain enamel composition is formed by preparing a slip containing a mixture comprising, in weight percent, about 39 to 52 quartz, 15 to 24 dehydrated borax, 6 to 12 boric acid, 5 to 8 potassium nitrate, 3 to 6 sodium silicofluoride, and 3 to 12 manganese dioxide, up to 15 titanium dioxide, up to 3 antimony oxide, up to 1 cobalt oxide, and up to 1 barium oxide, depositing the slip on the surface of the screen tooling, and then firing the slip to form the coating system.

4. The fiber preforming process according to claim 1, further comprising the step of depositing a release agent on the surface layer of the coating system prior to depositing the fiber material.

5. A fiber preforming process comprising the steps of:

providing a screen tooling having a coating system fused to a surface thereof, the coating system comprising a surface layer of a porcelain enamel composition containing quartz, dehydrated borax, boric acid, potassium nitrate, sodium silicofluoride, and manganese dioxide, and optionally a material selected from the group consisting of titanium dioxide, antimony oxide, a cobalt oxide, barium oxide and mixtures thereof;

depositing a fiber material on the surface layer of the coating system on the screen tooling;

bonding the fiber material together to form a fiber preform; and then removing the fiber preform from the screen tooling.

6. The fiber preforming process according to claim 5, wherein the screen tooling is a perforated member, the coating system being continuous over a surface of the perforated member.

7. The fiber preforming process according to claim 5, wherein the porcelain enamel composition is formed by:

preparing a slip containing a mixture comprising, by weight, about 39 to 52% quartz, 15 to 24% dehydrated borax, 6 to 12% boric acid, 5 to 8% potassium nitrate, 3 to 6% sodium silicofluoride, and 3 to 12% manganese dioxide, up to 15% titanium dioxide, up to 3% antimony oxide, up to 1% cobalt oxide, and up to 1% barium oxide;

depositing the slip on the surface of the screen tooling; and then firing the slip to form the coating system.

8. The fiber preforming process according to claim 5, further comprising the step of depositing a release agent on the surface layer of the coating system prior to depositing the fiber material.

9. The fiber preforming process according to claim 5, wherein the porcelain enamel composition consists essentially of, by weight, about 39 to 52% quartz, 15 to 24% dehydrated borax, 7 to 12% boric oxide, 5 to 12% potassium nitrate, 3 to 8% sodium silicofluoride, 3 to 12% manganese dioxide, up to 12% titanium dioxide, up to 8% antimony oxide, up to 1% cobalt oxide, and up to 1% barium oxide.

10. The fiber preforming process according to claim 5, further comprising the steps of placing the fiber preform in a mold, injecting a resin into the mold to infiltrate the fiber preform, and then curing the resin to form a fiber-reinforced article.

* * * * *